US012621365B2

(12) United States Patent
Zhang

(10) Patent No.: US 12,621,365 B2
(45) Date of Patent: May 5, 2026

(54) MULTI-POINT COMMUNICATION METHOD AND DEVICE FOR DESCRIBING AND PREDICTING EVENTS

(71) Applicant: CENTER FOR EXCELLENCE IN BRAIN SCIENCE AND INTELLIGENCE TECHNOLOGY, CHINESE ACADEMY OF SCIENCES, Shanghai (CN)

(72) Inventor: Jun Zhang, Shanghai (CN)

(73) Assignee: CENTER FOR EXCELLENCE IN BRAIN SCIENCE AND INTELLIGENCE TECHNOLOGY, CHINESE ACADEMY OF SCIENCES, Shanghai (CN)

( * ) Notice: Subject to any disclaimer, the term of this patent is extended or adjusted under 35 U.S.C. 154(b) by 72 days.

(21) Appl. No.: 18/765,704

(22) Filed: Jul. 8, 2024

(65) Prior Publication Data
US 2025/0016233 A1 Jan. 9, 2025

(30) Foreign Application Priority Data
Aug. 21, 2023 (CN) .......................... 202311060209.2

(51) Int. Cl.
*H04L 67/12* (2022.01)
*G01D 5/12* (2006.01)
*H04B 17/391* (2015.01)
(52) U.S. Cl.
CPC .............. *H04L 67/12* (2013.01); *G01D 5/12* (2013.01); *H04B 17/391* (2015.01)

(58) Field of Classification Search
CPC .. G01D 5/00; G01D 5/12; G01D 9/00; G01D 18/00; G01D 21/02; G06F 11/07;
(Continued)

(56) References Cited

U.S. PATENT DOCUMENTS

2019/0286857 A1* 9/2019 Kataoka .................... H04Q 9/00
2019/0287386 A1* 9/2019 Kadota ..................... G04C 9/00
(Continued)

FOREIGN PATENT DOCUMENTS

CN 202010265812 A * 4/2020

*Primary Examiner* — Shawkat M Ali
(74) *Attorney, Agent, or Firm* — NKL Law; Bin Lu; Allen Xue

(57) ABSTRACT
The present invention relates to multi-point synchronous communication technology, providing a multi-point communication device and its application in the field of artificial intelligence. Specifically, the present invention provides a multi-point communication method and device for describing and predicting events. The device utilizes the principle of multi-point synchronous communication to achieve multi-level description of complex events, description and prediction of timing events, recall, and the device has the functions of short-term memory and long-term memory. The device and the multi-point communication method adopted realize the synchronous description of all parameters of complex events in the same operation set, and avoid the disadvantages of pre-establishing channels between multiple communication terminals and high consumption of communication resources for obtaining channels through global broadcast.

20 Claims, 2 Drawing Sheets

(58) Field of Classification Search
CPC ......... G06F 15/173; G06F 21/00; G06N 3/02;
G06N 3/044; G06N 3/045; G08C 15/06;
G08C 19/26; G16Y 40/10; G16Y 40/50;
H04B 17/391; H04L 9/32; H04L 29/06;
H04L 41/16; H04L 67/12; H04W 4/38;
H04W 56/00; H04W 88/18
USPC .............. 375/219, 260, 267, 295, 316, 364;
709/223, 224; 726/5
See application file for complete search history.

(56) References Cited

U.S. PATENT DOCUMENTS

| | | | |
|---|---|---|---|
| 2022/0255718 A1* | 8/2022 | Matsumura ............ | G01D 21/00 |
| 2025/0071040 A1* | 2/2025 | Wang .................... | G16Y 40/50 |

* cited by examiner

MULTI-POINT COMMUNICATION METHOD AND DEVICE FOR DESCRIBING AND PREDICTING EVENTS

CROSS REFERENCE TO RELATED APPLICATION

This application claims the benefit of the filing dates of Chinese Patent Application No.: 202310831054.1, filed Jul. 7, 2023, and Chinese Patent Application No.: 202311060209.2, filed Aug. 21, 2023, each of which is incorporated by reference herein in its entirety.

FIELD

The present invention relates to an information communication method, to a method and device for describing complex events, using a multi-point communication approach to describe the objective substance world, and particularly relates to a multi-point communication method and device for describing and predicting complex events.

BACKGROUND

The description of events requires the participation of multiple parameters, and the asynchronous nature of data operations makes it impossible for existing computers to directly merge all the parameters describing the events into the same operation set. An accurate description of a single event consumes a large amount of logical operations and communication resources between various operation modules, leading to an exponential increase in computational requirements for a description of complex events, which limits a development of artificial intelligence in terms of intelligence, thinking speed, low power consumption, and so on.

Therefore, solving a synchronous operation of various parameters describing events is a key to revolutionizing the development of artificial intelligence.

SUMMARY

The technical problem to be solved by the present invention is to provide a multi-point communication method and device for describing and predicting events, solve the problem of non-cooperative operation of various parameters in event description, and achieve the description of complex events.

Technical Solution

A multi-point communication device for describing and predicting events, comprising a plurality of random paths and a plurality of communication terminals;

any one of the communication terminals connects one or more random paths, and the random paths connected to different communication terminals have mutually contacting or close positions with each other;

when a communication terminal is activated, the communication terminal oscillates in potential energy, and potential energy of the communication terminals and potential energy of the random paths connected thereto are synchronized;

when a potential energy difference between the random paths that are in contact with or close to each other exceeds a minimum connection threshold, the random paths are connected;

amplitude of the potential energy of the communication terminal that is activated is less than a minimum potential energy threshold required for connecting different random paths;

wherein, the event has different characterization parameters which activate different communication terminals, the activated communication terminals that are oscillate asynchronously in potential energy, when a superimposed potential energy difference exceeding the minimum connection threshold is formed between the random paths, the random paths connected to each activated communication terminal are prompted to interconnect, forming a network that describes the event.

In a preferred embodiment, potential energy of each communication terminal oscillates when it is in an activated state, and potential energy of each communication terminal and potential energy of the random paths connected thereto are synchronized;

when a potential energy difference between the mutually contacting or close positions of the random paths exceeds a minimum connection threshold, the random paths are connected at the positions;

amplitude of the potential energy of the communication terminals that are in the activated state is less than the minimum connection threshold required for connecting different random paths.

Furthermore, the multi-point communication device comprises a plurality of random paths and a plurality of communication terminal sets;

when two random paths are in contact with or close to each other, and when a potential energy difference between the two random paths exceeds a threshold $\Delta E_{TS}$, the two random paths in contact with or close to each other are connected;

each communication terminal set comprises multiple communication terminals, and each communication terminal set receives the same type of signals input from outside, different signal parameter values under the same type of signals activate different communication terminals in the communication terminal set;

each communication terminal connects to the plurality of random paths;

after the communication terminal is activated, its internal potential energy oscillates, and the random paths connected to the communication terminal oscillates in potential energy along with potential energy of the communication terminal; amplitude of potential energy of the communication terminal and amplitude of potential energy of the random paths connected thereto are defined as $E_{bit}$, $E_{bit} < \Delta E_{TS} < 2E_{bit}$;

the event is decomposed into a plurality of types of characterization signals, each characterization signal is input into the communication terminal set corresponding to the type of signal, and activates the communication terminals in the communication terminal set corresponding to parameter values of the signal, and potential energy of activated communication terminals and potential energy of the random paths connected thereto oscillate within the amplitude of $E_{bit}$ range;

different communication terminals activated by the plurality of types of characteristic signals corresponding to the event oscillates simultaneously and asynchronously in potential energy, when an absolute value of the potential energy difference between any two activated communication terminals exceeds $\Delta E_{TS}$ the random paths respectively connected to each of the two activated communication terminals are connected at their mutually contacting or close positions.

Furthermore, spatial positions of a starting point and an ending point of each random path within the multi-point communication device are randomly distributed, and a number of input end and a number of output end of each random path are 1 or more.

Furthermore, when an absolute value of the potential energy difference between any two activated communication terminals exceeds $\Delta E_{TS}$, the random paths respectively connected to each of the two activated communication terminals are temporarily connected at their mutually contacting or close positions; when the absolute value of the potential energy difference between any two activated communication terminals exceeds $2E_{bit}$, the random paths respectively connected to each of the two activated communication terminals generate long-term connections at their mutually contacting or close positions.

Furthermore, the potential energy of the connected random paths and communication terminals tend to be synchronized.

Furthermore, the multi-point communication device further comprises a potential energy amplifier, which is connected to the plurality of random paths; the potential energy amplifier is capable of receiving low-amplitude potential energy fluctuations input from the random paths connected thereto, and outputting high-amplitude potential energy fluctuations to the random paths or other random paths.

Furthermore, the amplitude of potential energy output by the potential energy amplifier is defined as $E_{Bit}$, $E_{Bit}>E_{bit}$. Preferably, $2E_{bit}>E_{Bit}>E_{bit}$.

Further, several characterization signals corresponding to the event include one or more of light signals, force signals, sound signals, temperature signals, and acceleration signals; the light signal includes spectrum and light intensity, and the parameter values of the light signal, temperature signal, and force signal include spatial coordinate information.

Furthermore, a weak connection path gathering area is provided in the multi-point communication device, and in this area, weak connection paths are only temporarily connected to each other, and the weak connection paths are not long-term connected to each other.

Furthermore, the communication terminal is connected to a plurality of random paths through the weak connection paths, wherein the weak connection paths are only temporarily connected to each other, and are not long-term connected to each other.

Furthermore, the events are obtained from a real world or directly from a virtual world through a detector. Information of the events obtained from the virtual world and the real world is classified. Different parameter value information in a certain type of parameter information of the same or similar properties activates different communication terminals and random paths or random path clusters connected thereto in the multi-point communication device.

Further, the detector is selected from one or more detectors for detecting light signals, force signals, sound signals, temperature signals, acceleration signals, electric field signals, and magnetic field signals; the light signal includes spectrum and light intensity, the sound signal includes sound frequency and loudness, the force signal and acceleration signal include intensity and direction, and the electric field signal and magnetic field signal include field intensity and direction.

Furthermore, the detector includes a micro-detector array inside, and the connection between the signal output end of each micro-detector in the micro-detector array and the specific communication terminal is constant.

Furthermore, the event signal input by the detector to the multi-point communication device is from the detection of the real world, or from the signal of a virtual event output by an electronic computer program, or from the signal output by other multi-point communication devices.

Furthermore, the random paths are selected from nerve cells, or selected from communication wave bands of a specific frequency, or selected from semiconductor paths having properties of the random paths described in the technical solution, or a physical electrical circuit with a similar role, or one or more of the above.

A method for generating an internal network of a multi-point communication device, comprises: detecting a same event via a plurality of detectors so as to obtain parameters of different dimensions of the same event, inputting parameters of each dimension into a corresponding communication terminal set, then activating the corresponding communication based on different parameter values under the dimension terminals, activating communication terminals in different communication based on the parameters of different dimensions synchronously terminal sets, so that multiple activated communication terminals in the multi-point communication device oscillates asynchronously in potential energy, and the activated communication terminals are connected to each other through random paths, forming a description network for the event;

a low-level description network serves as a communication terminal of a high-level description network for describing complex events.

Furthermore, the random paths in the homogeneous body are wrapped with a supporting medium, the potential energy of the supporting medium is defined as zero-point potential energy, and the potential energy inside the random paths oscillates around the zero-point potential energy value.

Furthermore, a multi-level description network is generated within the multi-point communication device through description training using standard events.

Furthermore, the standard events refer to a set of events (or an event set) with a common dimension parameter x-a and several sets of non-common dimension parameters y=b, c, d, e, . . . , and the description function of the set of events is F (x=a, y=b, c, d, e, . . . ). After training with standard events, a set of sub-networks (sub-network set) is formed, in which any sub-network in the set of sub-networks is connected to a common dimension parameter unit with a common dimension parameter of x=a, and each sub-network is also randomly connected to one or more non-common dimension parameter units with non-common dimension parameters of y=b, c, d, e, . . . .

Furthermore, multiple sets of standard events F (x=a/b/c/d/e/ . . . , y=b, c, d, e, . . . , z=b, c, d, e, . . . ) are used to train the description device, and a plurality of sets of sub-networks are obtained. The plurality of sets of sub-networks are defined as level II parameter units according to different common dimension parameter units connected to each sub-network set (e.g., divided into the network nodes of (x=a, and/or y=b, c, d, e, . . . , and/or z=b, c, d, e, . . . , . . . ), (x=b, and/or y=b, c, d, e, . . . , and/or z=b, c, d, e, . . . , . . . ), (x=c, and/or y=b, c, d, e, . . . , and/or z=b, c, d, e, . . . , . . . ), . . . )

Level II parameter units with standard events are trained to obtain Level III parameter units, and so on. N (N=2, 3, 4, 5, 6 . . . ) Level parameter units are obtained by training.

Furthermore, the capacity of describing events of each level within the multi-point communication device is $N_i$, where i is the level of the highest event; $n_0$ is the number of communication terminals within the multi-point communication device connected to the external sensor input signal terminal; $R_i$ is the available channel density function within the multi-point communication device, $$N_i = \sum_{m=1}^{n_0+N_1+N_2+...+...+N_{i-1}} R_i C_{n_0+N_1+N_2+...+N_{i-1}}^m$$

Furthermore, the total capacity of the multi-point communication device is N, $$N = \sum_{i=1}^{i} N_i, \, .N_i = \sum_{m=1}^{n_0+N_1+N_2+...+...+N_{i-1}} R_i C_{n_0+N_1+N_2+...+N_{i-1}}^m$$

Furthermore, the multi-point communication device is taught through sensors in accordance with a method of nurturing newborn babies in human civilization.

A method for describing timing events in a multi-point communication device, wherein: frame events refer to events that do not evolve; timing events comprise several frame events, each of which has the same parameter values, and each of which has one or more different parameter values, and changes of one or more different parameters between the frame events have timing sequential and continuous characteristics; steps for describing timing events comprising:

Step 1: completing a description of a pre-frame event in the multi-point communication device;

Step 2: closing a communication terminal(s) corresponding to the parameters in the pre-frame event that do not overlap with a post-frame event, and the communication terminals that have been closed are separated from an original communication terminal network describing the pre-frame event; keeping a communication terminal(s) in an activated state corresponding to parameters in the post-frame event that overlaps with the pre-frame event, synchronously activating a communication terminal(s) corresponding to parameters in the post-frame event that does not overlap with the pre-frame event and connecting the communication terminals that are activated to the network describing the pre-frame event to form a network describing the post-frame event, thereby completing a transition from describing the pre-frame event to describing the post-frame event;

Step 3: after describing the post-frame event, using the post-frame event as a new pre-frame event to initiate a description of a further post-frame event, and then describing each frame event within a complete timing event frame by frame to form a description network for a complete timing event.

Furthermore, a network connection channel for a transition from the pre-frame event activation state to the post-frame event activation state has been formed between the pre-frame event and the post-frame event in the description network for timing events, and the transition from is an optimal solution for the communication terminals to connect driven by potential energy differences; the description of each frame in the timing events using an internal network of the multi-point communication device is encoded from frame to frame through potential differences of the optimal solution, the transition from the pre-frame event activation state to the post-frame event activation state is an inevitable result driven by potential energy differences, and the timing naturally exists in the description network for the timing event formed in the multi-point communication device.

A method for predicting unknown events using a multi-point communication device, the multi-point communication device describes timing events, after an activation network migrates from a description network of a start frame event network to a description network of an end frame event network, in an activated description network of the end frame event network, potential energy within each communication terminal and potential energy within communication network forms a certain three-dimensional potential energy distribution structure in a three-dimensional space structure of the multi-point communication device, and when a potential energy difference between the three-dimensional space structure and other communication terminals exceeds a communication threshold $\Delta E_{TS}$, realizing a migration from a description network activation state that is existed to a new network activation state formed by autonomous induction, and realizing a prediction of a next unknown progress direction of the preceding timing events, that is, autonomous thinking;

Preferably, the other communication terminals are selected from randomly activated communication terminals, or are selected from communication terminals activated in real-time by external environmental events through detectors.

A multi-point communication device, which comprises a neural cell cluster, a neural development and maintenance system for maintaining growth and development of neural cells, and an array voltage controller which is connected to the nerve cells in the nerve cell cluster through nerve electrodes to transmit electrical signals and can regulate electric potential within each nerve cell connected thereto;

the device further comprises a data source that can output event information, where the event information output by the data source has different information parameters, the different information parameters are converted into asynchronously changing electric potentials through the array voltage controller, and then corresponding asynchronously changing electric potentials are simultaneously generated within different nerve cells through connected neural electrodes, and a superimposed difference of the electric potentials generated between nerve cells.

Furthermore, the neural cell cluster comprises a plurality of nerve cell clustering regions connected to each other, and different nerve cell clustering regions are respectively used to receive parameter information of different properties input by the nerve electrodes.

Furthermore, the array voltage controller generates electric potential differences between several neural electrodes with signal inputs, the electric potential differences including at least two levels, a smaller electric potential difference (s) is used to promote a temporary connection between the neural cells connected by different electrodes with signal inputs, while a larger electric potential difference(s) is used to promote a continuous connection between the neural cells connected by different electrodes with signal inputs.

Furthermore, the device also comprises a second array voltage controller, which is named "hippocampus", the hippocampus is connected to several nerve cells, and is capable of receiving low-amplitude potential energy fluctuations input from nerve cells thereto, and output high-amplitude potential energy fluctuations ($E_{Bit}$) to the nerve cells or other nerve cells connected to the hippocampus, so as to promote long-term connection between the nerve cells that receive high-amplitude potential energy fluctuation input.

Furthermore, the large range and continuous output of high amplitude potential energy fluctuations of the hippocampus are used to actively activate multi-point communication devices to describe and predict high-level complex events.

Furthermore, the data source is selected from one or both of sensors and computer systems that generate event information.

Furthermore, the sensors are used for real-time detection of the physical environment. The sensor includes a plurality of array sensors and the sub-sensors in each array sensor act in correspondence with a plurality of specific nerve cells.

Furthermore, the multi-point communication device also includes an execution system, which is connected to a plurality of nerve cells in a nerve cell cluster through nerve electrodes and is controlled by the connected nerve cells.

Further, the sensor is arranged on the execution system.

Further, the sensor is selected from one or more of a mechanical sensor, a temperature sensor, a sound sensor, an optical sensor, a radio sensor, an acceleration sensor, and an air pressure sensor.

In a preferred embodiment, the timing events are dynamic events, developing events, and events changing over time.

Beneficial Effects

The present invention provides a multi-point communication device and a multi-point communication method. The device utilizes a multi-point synchronous communication method to achieve multi-level description of complex events, description and prediction of timing events, recall, and the functions of short-term memory and long-term memory. The device and the multi-point synchronous communication method adopted realize the synchronous description of all parameters of complex events in the same operation set, and avoid the disadvantages of pre-establishing channels between multiple communication terminals and high consumption of communication resources for obtaining channels through global broadcast.

DETAILED DESCRIPTION

Figure 1:
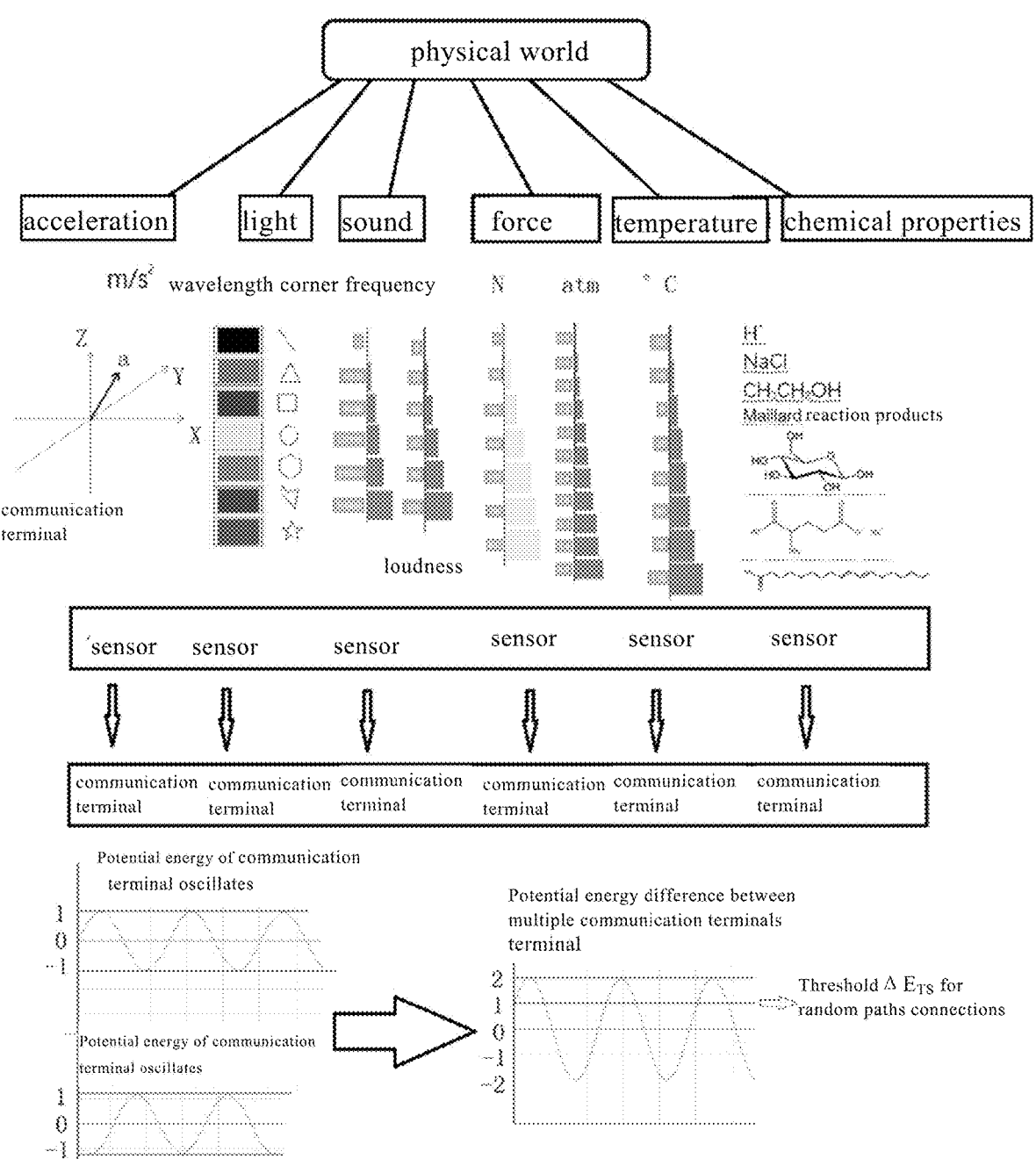
FIG. 1 is a schematic diagram of the principle of the description of complex event of the present application.
Figure 2:
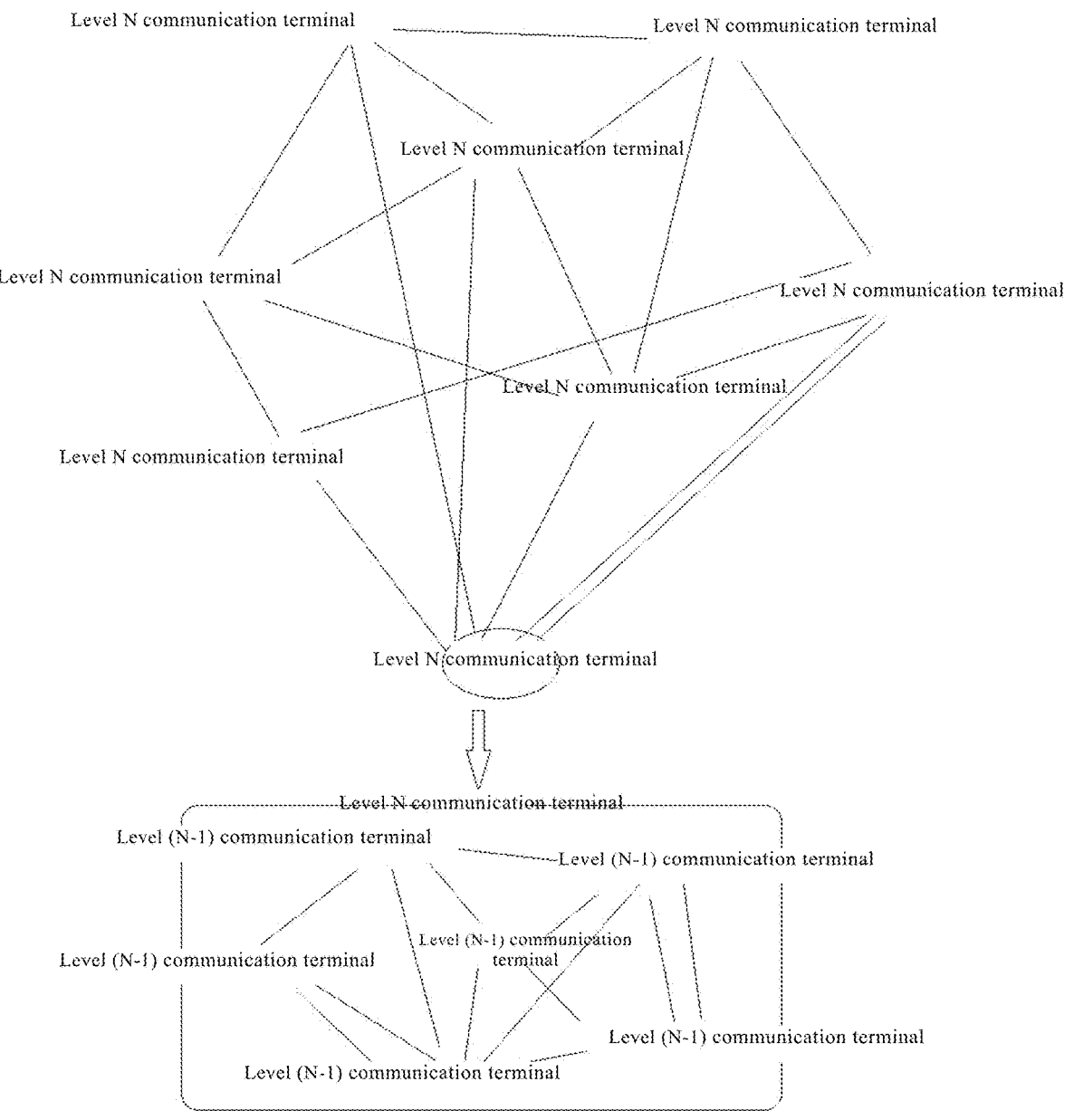
FIG. 2 is a schematic diagram of a communication network formed by describing complex events through the multi-level communication terminals of the present application.

The present invention will be further described below in conjunction with specific embodiments and FIGS. 1 and 2.

Logical operations are the underlying foundation for the operation of existing electronic computers, but are limited by the step-by-step progressive operations of 0/1 logic gates in integrated circuits. Even if multiple parameters can be calculated in parallel on a chip, the sub-operation units that run each parameter are actually independent of each other. Ultimately, all parallel operation data are merged through instructions or chip architecture design to obtain the operation result. This operation method cannot introduce too many parameters into a single sub-operation unit, and cannot truly perform multi-parameter synchronous operations at the microscopic level. As a result, when existing electronic computers describe complex events with multiple parameters, the amount of operations increases exponentially with the increase of parameters describing complex events, which requires the computers to consume a large amount of computing and storage resources to process complex events.

Potential energy represents the tendency of substance movement. By utilizing the tendency of spontaneous reduction of potential energy, and inputting high potential energy into the system without releasing it, it is possible to detect the potential energy difference exceeding the threshold point in any area of the entire system with almost no energy loss, so that the high potential energy end and the low potential energy end can be associated with each other without almost any energy loss, logic calculation, or time delay. This avoids the disadvantages of pre-establishing channels between multiple communication terminals and high consumption of communication resources for obtaining channels through global broadcast. One of the core principles of the technical solution of this patent application is to use the tendency of spontaneous reduction of potential energy to describe complex events with an infinite number of parameters.

Example 1 Method of Multi-Point Communication

There are various forms of communication modes between existing multiple transceivers, including broadcast mode and point-to-point channel mode. The broadcast mode requires broadcasting to the entire environmental system. On the one hand, this mode consumes higher energy, and on the other hand, only one channel is allowed to be established in the same frequency spectrum and instantaneously in the entire environmental system. Although the point-to-point channel mode avoids the energy consumption mode of broadcasting to the entire environment system, it requires pre-establishing point-to-point channels. Therefore, a non-broadcast, non-pre-established channel communication mode between multiple points still does not exist.

In this embodiment, the multi-point communication device comprises a plurality of random paths and a plurality of communication terminal sets. When the input ends and the output ends of two random paths are in contact with or close to each other, and a potential energy difference between the two random paths exceeds a threshold $\Delta E_{bit}$, the input ends and the output ends of the two random paths in contact with or close to each other are connected;

The multiple activated communication terminals within the multi-point communication device oscillate asynchronously in potential energy, and the internal potential energy of the random paths to which the corresponding communication terminals are connected also oscillate accordingly. The amplitude of the potential energy oscillation of the communication terminals itself is defined as $E_{bit}$, and the potential energy difference between the two communication terminals is defined as $\Delta E_{bit}$; a minimum potential energy difference between two contacting/approaching random paths to achieve connection is $\Delta E_{TS}$, $\Delta E_{TS} > E_{bit}$. Preferably, $2E_{bit} > \Delta E_{TS} > E_{bit}$.

When the potential energy difference $\Delta E_{bit}$ between any two communication terminals is greater than $\Delta E_{TS}$, the potential energy difference $\Delta E_{bit}$ between the random paths to which each of the two communication terminals connected is greater than $\Delta E_{TS}$. At this time, the two random paths are connected at their contacting or close positions, realizing the connection of the random paths between multiple communication terminals, and thus realizing the establishment of communication channels between multiple communication terminals to be communicated within the multi-point communication device, further forming a communication network in which multiple communication terminals are connected.

Example 2 Use of Multi-Point Communication Technology in Describing Events

An event requires description of multiple parameters, or a set of multiple parameters together is defined as an event. The description of an event requires recording all parameters of the event and storing them according to the logical relationships within the event. Therefore, synchronously recording all parameters of the event and establishing relationships between parameters is the most efficient way to describe the event. In this embodiment, the multi-point communication device described in Example 1 is used. Various parameters of the event are converted into input signals through sensors to activate several communication terminals in the multi-point communication device. The activated multiple communication terminals produce potential energy oscillations, and a channel is established through the multi-point communication method described in Example 1. The multiple communication terminals and the formed communication network are taken as a parameter description set to jointly realize the description of the event.

Example 3 Hierarchical Parameter Description Set

On the basis that the multiple communication terminals and the formed communication network are taken as a parameter description set to jointly realize the description of the event in Example 2, after the multiple communication terminals and the communication network formed for description of the event form a path, the potential energy of each location within the parameter description set is balanced.

In this embodiment, the event that has been described above is defined as a Level I event. The communication terminal in the parameter description set corresponding to the Level I event is defined as the Level I communication terminal. The corresponding parameter description set is defined as the Level I parameter description set. The potential energy between the Level I communication terminal in the parameter description set and the communication network is balanced. In this embodiment, the Level I parameter description set is defined as the Level II communication terminal. A combination event of multiple Level I events (Level II events) is described by using the multi-point communication device described in Example 2 to obtain a Level II parameter description set, which is defined as the Level III communication terminal. Similarly, the N-level communication terminal and N-level parameter description set are defined.

Specifically, a Level II event is described by using a multi-point communication device with several Level II communication terminals obtained through training. The Level II event contains the contents of multiple Level I events and has more descriptive parameters than the Level I event. The Level II event is converted into more input signals to activate the Level I communication terminal. As the percentage of activated Level I communication terminals in a Level II communication terminal gradually increases, the amplitude of overall potential energy $E_{bit2}$ of the Level II communication terminal gradually increases, and the potential energy $E_{bit2}$ of multiple Level II communication terminals themselves oscillates asynchronously. When the potential energy difference $\Delta E_{bit2}$ between each level II communication terminal is greater than $\Delta E_{TS}$, the random paths randomly arranged between the Level II communication terminals are connected to each other, so as to establish a communication network between multiple points to be communicated inside the multi-point communication device, thereby completing the description of Level II event and obtaining a parameter description set (including the channel network formed by the Level II communication terminals) formed by describing the Level II event. The parameter description set formed by describing the Level II event is defined as a Level III communication terminal. In addition, some Level I communication terminals that are not included in the Level II communication terminals are activated in the Level II event, and their own potential energy $E_{bit}$ will also show asynchronous oscillation with the potential energy $E_{bit2}$ of the Level II communication terminal, forming a channel network in which the Level I communication terminals and the Level II communication terminals are mixed with each other. That is, the Level I communication terminals bypasses the Level II communication terminal where they are located, and independently establish a network connection with other level II communication terminals, forming part of the level III communication terminal.

Similarly, based on the complexity of the described event, different levels of communication terminals and corresponding channel networks can be trained, and the higher-level communication terminals can be compatible with the lower-level communication terminals that cross levels. The number of trained communication terminals and corresponding channel networks of different levels increase rapidly and exponentially as the level increases, specifically:

The number of Level I communication terminals is assumed as $N_1$, the number of level II communication terminals is assumed as $N_2$, and the network redundancy parameter is assumed as $R_n$. The $R_n$ depends on level network density of each level inside the multi-point communication device and is positively correlated with the random path length, random path density, number of nodes, and number of random path branches.

Assuming that the multi-point communication device has been trained with different levels of events with maximum carrying capacity; then, The number of Level I communication terminals is $N_1$, $$N_1 = \sum_{m=1}^{n_0} R_1 C_{n_0}^m$$

The number of Level II communication terminals is $N_2$, $$N_2 = \sum_{m=1}^{n_0+N_1} R_2 C_{n_0+N_1}^m$$

The number of Level III communication terminals is $N_3$, $$N_3 = \sum_{m=1}^{n_0+N_1+N_2} R_3 C_{n_0+N_1+N_2}^m$$

$$\vdots$$

The number of i-level communication terminals is $N_i$, $$N_i = \sum_{m=1}^{n_0+N_1+N_2+...+...+N_{i-1}} R_i C_{n_0+N_1+N_2+...+N_{i-1}^m}^m$$

The capacity of describing each level of events inside the multi-point communication device is N.

$$N = \sum_{i=1}^{i} N_i, \; N_i = \sum_{m=1}^{n_0+N_1+N_2+...+...+N_{i-1}} R_i C_{n_0+N_1+N_2+...+N_{i-1}^m}^m$$

Where i is the level of the highest event; no is the number of communication terminals inside the multi-point communication device connected to the external sensor input signal terminal; $R_i$ is a network redundancy parameter inside the multi-point communication device. When the density of available channels inside the multi-point communication device is high, there are multiple coexisting channel networks describing the same event.

Example 4 Method for Describing a Timing Event(s)

A timing (or sequential or time-series) event(s) refers to a series of events with multiple overlapping parameters. A timing event includes several frame events, each of which has the same parameter values, and each of which has one or more different parameter values. The changes of one or more different parameters between each frame event are sequential.

For example, the event of "an apple falling from a tree" is a timing event, and the scene at every moment in the falling process of the apple is a frame event; in this example, the static apple tree, the static earth, the red color of the apple, the blue sky, and the white clouds in the sky are all the same parameter values that exist between each frame event, and the three-dimensional spatial coordinate position that constantly changes when the apple falls is the continuously changing and interrelated different parameter values that exist between each frame event.

The description of timing events is based on the description of frame events. The preceding frame (pre-frame) event is described in the multi-point communication device, and then the multi-point communication device describes the next frame event or subsequent frame (post-frame) event. Since there are multiple overlapping parameters and one or more non-overlapping parameters between the pre-frame event and the post-frame event, in the post-frame event description process, the communication terminals and networks describing most of the parameters of the post-frame event are directly inherited from the communication terminals and networks of the pre-frame event (that is, in the description of the post-frame event and the pre-frame event, the communication terminals and networks of the overlapping parameters are the same). The communication terminals corresponding to parameters in the post-frame event that does not overlap with the pre-frame event are activated and incorporated into the communication terminals network describing the pre-frame event. The communication terminals corresponding to the parameters in the pre-frame event that do not overlap with a post-frame event are disabled and separated from communication terminal network describing the pre-frame event, so as to realize the closing of the pre-frame event description and complete the post-frame event description. Subsequently, after describing the post-frame event, using the post-frame event as a new pre-frame event of the next stage to initiate a description of a further post-frame event, and then describing each frame event within a complete timing event frame by frame to complete the description of the timing event.

The timing events are described frame by frame in sequence. In essence, the communication terminals corresponding to the common parameters of each frame event are always included in the all description network of the timing events, and the communication terminals corresponding to the differential parameters of each frame event are included in the description network of the corresponding frame events in sequence according to the temporal development of the events. From this, it can be seen that the entire process of describing timing events is a process in which non-overlapping communication terminals gradually access the proliferative cognitive network dominated by the overlapping communication terminal network in accordance with the development order of timing events. After the multi-point communication device completes the description of the timing events, the parameter description set formed inside it includes a common subset and several difference subsets. For the description results of the timing events, the multi-point communication device realizes the merging of the description network and the automatic merging of the common parameters describing multiple events. It is an intuitive reflection of the common parameters describing multiple events extracted from the description network at the physical level, and realizes the compression of the same repeated data, that is, the communication terminals of various levels inside the multi-point communication device are shared in the description of different events.

Example 5 Migration of Frame Events

As in the above-mentioned embodiment, after the multi-point communication device is trained using the timing events, a description network for the timing events has been formed inside. In the description network of timing events, the communication terminals corresponding to the newly introduced differential parameters of the post-frame event is the optimal internal communication channel of the multi-point communication device corresponding to three-dimensional spatial distribution of the potential energy intensity of the network and the potential energy area of the pre-frame event activation state. Only under this channel, the absolute value of the superimposed function of the potential energy of the pre-network and the potential energy of the communication terminals corresponding to the newly introduced differential parameter is the highest, that is, the transition from the pre-frame event activation state to the post-frame event activation state is the optimal solution for the multi-point communication device to communicate driven by the potential energy differences. Since a network channel for the transition from the pre-frame event activation state to the post-frame event activation state has been formed inside the multi-point communication device after being trained by the timing events, the transition from the pre-frame event activation state to the post-frame event activation state is the inevitable result of the multi-point communication device driven by the potential energy differences. Therefore, the internal network of the multi-point communication device describing each frame of the timing event encodes the frames through the optimal solution (potential energy difference), and the multi-point communication device in this technical solution naturally has sequentially in the network describing the timing events.

And the multi-point communication device reactivates each frame event according to the sequentially, which is a recall of the timing events.

Example 6 Prediction

As the principle of frame event migration described in the above embodiment, all description networks for timing event trained in the multi-point communication device always have a start frame and an end frame. After an activation network migrates from the start frame to the end frame, potential energy within each communication terminal and potential energy within communication network of activated state of the end frame forms a certain three-dimensional potential energy distribution structure in a three-dimensional space structure of the multi-point communication device. Although there is no trained internal communication channel of the multi-point communication device at this time, the three-dimensional distribution potential energy structure, in addition to its own network channel, still has other communication terminals that may have a difference with the internal potential energy of the network that exceeds the communication threshold $\Delta E_{TS}$ and can form a path, thereby realizing the migration from a network activation state that is existed to the new network activation state formed by autonomous induction, that is, the prediction of the preceding timing events. The new network formed by autonomous induction is the prediction event for the preceding event, which is the calculation result of the trained multi-point communication device for complex events, that is, autonomous thinking.

In this embodiment, a random activation mode of the communication terminal can also be introduced. When the potential energy difference between the randomly activated communication terminals and the end frame event exceeds the communication threshold $\Delta E_{TS}$, a new internal network of multi-point communication device is formed by internal network of the multi-point communication device corresponding to the end frame event and the randomly activated communication terminals, thereby forming a predicted event.

In this embodiment, it can also be considered that the sensors connected to the multi-point communication device continuously convert external environmental events into signals and input them into different communication terminals. The signals randomly activate different communication terminals and the corresponding network combination of the activated frame events, a new internal network activation state of multi-point communication device is formed, and the prediction event is achieved by inducing the formation of the end frame event.

In this embodiment, a potential energy accumulation mode can also be introduced. The potential energy amplitude in the internal network of the multi-point communication device activated by the end frame event gradually increases over time, and the threshold between it and the potential energy of other communication terminals must exceed the communication threshold $\Delta E_{TS}$, forming a new internal network activation state of the multi-point communication device, thereby realizing the formation of a predicted event by inducing the end frame event.

Example 7 Short Term Memory and Long-Term Memory

The potential energy of multiple activated communication terminals within the multi-point communication device oscillate asynchronously, and the internal potential energy of the random paths to which the corresponding communication terminals are connected also oscillate accordingly. The amplitude of the potential energy oscillation of the communication terminals itself is defined as $E_{bit}$, and the potential energy difference between the two communication terminals is defined as $\Delta E_{bit}$; a minimum potential energy difference between two contacting or approaching random paths to achieve connection is defined as $\Delta E_{TS}$, $2E_{bit} > \Delta E_{TS} > E_{bit}$.

When the potential energy difference $\Delta E_{bit}$ between any two communication terminals is greater than $\Delta E_{TS}$, the potential energy difference $\Delta E_{bit}$ between the random paths to which each of the two communication terminals connected is greater than $\Delta E_{TS}$. At this time, the two random paths are connected at their contacting or close positions, realizing the connection of the random paths between multiple communication terminals, and thus realizing the establishment of communication channels between multiple communication terminals to be communicated within the multi-point communication device, forming a communication network in which multiple communication terminals are connected.

As described in the above embodiment, there is a communication threshold $\Delta E_{TS}$ between random paths. When the potential energy difference $\Delta E_{bit}$ between any two random paths that are in contact with or close to each other is greater than $\Delta E_{TS}$, the random paths respectively connected to each of the two activated communication terminals are temporarily connected at their mutually contacting or close positions. When the absolute value of the potential energy difference between any two activated communication terminals exceeds $2E_{bit}$, the random paths respectively connected to each of the two activated communication terminals generate long-term connections at their mutually contacting or close positions.

In a preferred embodiment of this embodiment, the multi-point communication device further comprises a potential energy amplifier, which is connected to multiple random paths; the potential energy amplifier is capable of receiving low-amplitude potential energy fluctuations input from the random paths connected thereto, and outputting high-amplitude potential energy fluctuations to the random paths or other random paths. The potential energy amplifier outputs high-amplitude potential energy fluctuations to the random paths. The amplitude of potential energy of the random paths is defined as $E_{Bit}$, $2E_{bit} > E_{Bit} > E_{bit}$. Therefore, the potential energy fluctuation output by the potential energy amplifier causes the potential energy difference between the communication terminals to exceed $2E_{bit}$, thereby enabling a long-term connection between the communication terminals.

Example 8: Structure of a Multi-point Communication Device

The device structure of this embodiment includes a neural cell cluster, a neural electrode array(s), an electrode array voltage controller(s), a sensor(s), a neural development and maintenance system, and may also include an execution system.

The neural electrode includes a receiving neural electrode with one end connected to a single neural cell or a neural cell cluster and the other end connected to a sensor signal input end; and also includes an output neural electrode with one end connected to a single neural cell or a neural cell cluster and the other end connected to the execution system.

The sensor inputs the detected physical signals of the same type but with different values into different receiving neural electrodes respectively.

The electrode array voltage controller can, when detecting that one or more sensors input electrical signals into the neural electrode arrays, regulate the electric potential of all or part of the neural electrodes with signal input or produce periodic or non-periodic oscillations simultaneously within a controllable time, thereby generating an electric potential difference between different neural electrodes with signal inputs, thereby promoting connection between the nerve cells connected to the different electrodes with signal inputs.

Furthermore, the electrode array voltage controller generates electric potential differences between several neural electrodes with different signal inputs, the electric potential differences including at least two levels. A smaller electric potential difference(s) is used to promote a short-term connection (transient memory) between the neural cells connected by different electrodes with signal input, while a larger electric potential difference(s) is used to promote a continuous connection (long-term memory) between the neural cells connected by different electrodes with signal input. In the present technical solution, the duration of the both of the short-term connection and the continuous connection refers to relative values. The actual connection time of the both determines the degree of preference of the device for different events and does not affect the operation of the device.

Further, the device further comprises a second array voltage controller, which is named "hippocampus", the hippocampus is connected to several nerve cells, and is capable of receiving low-amplitude potential energy fluctuations input from nerve cells thereto, and output high-amplitude potential energy fluctuations ($E_{Bit}$) to the nerve cells or other nerve cells connected to the hippocampus, so as to promote to produce continuous connection between the nerve cells that receive high-amplitude potential energy fluctuation input, forming long-term memory.

Furthermore, the hippocampus selectively outputs high-amplitude potential energy fluctuations over a large range and continuously, which synchronously activate multiple networks for parallel operations, thereby activating multi-point communication devices to describe and predict higher-level complex events.

Further, the sensor is selected from one or more of a mechanical sensor, a temperature sensor, a sound sensor, an optical sensor, a radio sensor, an acceleration sensor, and an air pressure sensor. One or more sensors of each type are provided; some or all of the sensors are provided on the execution system.

In this technical solution, various forms of random paths can be selected, such as neural cells that can be electrically promoted to fuse, electronic devices with similar functions, and modified chip etching circuits. The multi-point communication devices produced by different types of random paths only differ in their operating efficiency, but there is no substantial difference in the essential principles of their operation and the results produced by their operation. In the implementation of this technical solution, specific devices should not be used to limit the scope of implementation of this technical solution. As long as the functions described in this technical solution can be achieved, a multi-point communication device that describes and predicts events can be manufactured.

Example 9: Working Mechanism of Potential Energy Communication in the Central Nervous System Based on the multi-point communication method for describing and predicting events proposed in this application, it is speculated that the neural system in the evolved biological brain in a parallel space-time universe operates using a potential energy communication working mechanism, and the specific working method is as follows:

Events in the physical world are input into different brain regions in a short period of time through visual neural signals, auditory neural signals, temperature neural signals, acceleration neural signals, and force neural signals, activating neurons in different brain regions respectively. For neurons in the brain, there is a minimum potential energy difference (i.e., potential energy difference threshold). Only when the potential energy difference between two neurons exceeds the potential energy difference threshold, the neurons will be connected and information can be transmitted between the neurons. The relationship between the specific potential energy difference threshold and the potential energy oscillation of a single neuron is detailed in Examples 1 and 7. The potential energy of the activated neurons in each brain region oscillates asynchronously with each other. Due to the asynchronous potential energy oscillation, the potential energy difference between different activated neurons exceeds the potential energy difference threshold for neuron connection, and different activated neurons are connected to each other to form a neural network that describes events in the physical world. The corresponding multi-level network architecture is the same as the architecture and formation mechanism described in Example 3.

Correspondingly, the reason why the hippocampus in the brain can consolidate short-term memory and convert it into long-term memory is that the hippocampus is actually a "transformer" of neuronal potential energy. Neurons are connected to the hippocampus, and neurons input low potential energy oscillations to the hippocampus. After the hippocampus receives such low potential energy oscillations, the hippocampus will output high potential energy oscillations to the neuron or other neurons. It is with the participation of the hippocampus that the originally asynchronous low potential energy amplitude oscillations between multiple neurons are converted into asynchronous high potential energy amplitude oscillations between multiple neurons. The potential energy difference formed between neurons with high potential energy oscillations is much higher than the potential energy difference threshold mentioned above. The higher potential energy difference between neurons promotes the formation of permanent connections between neurons, namely long-term memory. The specific principle is the same as that of Example 7.

Based on the above information, combined with the contents of Examples 1 to 7, the principle of potential energy oscillation can be used to input memories into the brain, erase memories, integrate more neuronal cells into a mature brain to expand brain capacity, interconnect multiple brains, synchronize the brain with chip operations, and connect various brain regions to a virtual computer system.

In the potential energy communication mode, the transmission of neuronal information, the role of Ranvier node, and the role of neurotransmitters are as follows.

There is a view that when the brain thinks, information is transmitted from one neuron to the next neuron: the nerve impulse of the activation state of neuron is transmitted forward along the axon until it reaches the end of the axon of the neuron, releasing neurotransmitters that activate the next neuron, completing the transmission of information to the next neuron. In the potential energy communication theory, information is not transmitted from one activated neuron to another as described above. Instead, the information is decomposed between two or more neurons. The oscillation of the potential energy of each neuron promotes the connection between neurons, and then the information is reintegrated into complete information in the form of a neural network.

The role of the Ranvier nodes: Regarding the role of the Ranvier node structure on the surface of nerve axons, some believe that it accelerates the transmission of nerve impulses. But in the potential energy communication theory, the more critical role of the Ranvier nodes is to modulate the oscillation function of the overall electrical potential of the neuron when the neuron's nerve impulse is transmitted. The Ranvier nodes on the surface of axons of different types of neuronal cells have different lengths, densities, and arrangements. The differences in the Ranvier nodes in different neurons make the Ranvier nodes to modulate different neuronal potential oscillation functions when the axons generate nerve impulses, achieving the matching of the potential energy oscillation functions of specific types of neurons, thereby achieving communication and connection between specific types of neurons.

The role of neurotransmitters: Regarding the role of neurotransmitters, there is a view that the neurotransmitters released by the axon of the previous neuron are transmitted to the dendrites of the next neuron, thereby activating the next neuron. In the potential energy communication theory, we can come to the exact opposite view, which is as follows. The more important role of neurotransmitters is to terminate the connection between the neuron that releases the neuron and the next neuron at the potential energy level, that is, the conduction process of the nerve pulse in the axon is the process of maintaining the potential energy oscillation of the neuron. When the nerve pulse reaches the end of the axon, the neuron can no longer maintain the potential energy oscillation of the neuron. The neuron loses its meaning in the entire potential energy communication process, thereby releasing neurotransmitters to cut off the connection between the neuron and the next-level neuron at the potential energy level, and at the same time start the potential energy oscillation of the next-level neuron, that is, the nerve pulse. Specifically, after the information is decomposed, different neurons are activated. The activated neurons do not directly contact each other, but each activated neuron is connected to the lower-level neurons. The activated neurons connect with other activated neurons through the connected lower-level neurons. Therefore, the potential energy oscillations of the activated neurons should be synchronized to the lower-level neurons to which they are connected, so as to generate potential energy differences between the lower-level neurons connected to different activated neurons, and form a neural network between multiple lower-level neurons through these potential energy differences. Therefore, the activated neuron and its connected lower level neurons can be regarded as a whole with synchronized potential energy. When the axon of the activated neuron transmits a pulse, the pulse plays a role in maintaining the overall potential energy oscillation of the entire activated neuron and the lower-level neurons connected thereto. When the nerve pulse of the activated neuron is transmitted to the end of the axon, the activated neuron has lost the function of continuing to maintain the potential energy oscillation. At this time, the axon releases neurotransmitters, and the neurotransmitters cut off the connection between the next-level neurons and the activated neuron at the potential energy level. At the same time, the neurotransmitters activate the next neuron, and the activated lower-level neurons take over the role of continuing to maintain the potential energy oscillation of this neuron and the further lower-level neurons, until multiple activated neurons are connected to each other to form a neural cognitive network for information.

As used herein, the terms "minimum connection threshold" and "minimum potential energy threshold" are used interchangeably and have the same meaning.

As used herein, the terms "a," "an," and "the" include the plural forms as well, unless clearly indicated otherwise. With respect to the use of substantially any plural and/or singular terms herein, those having skill in the art can translate from the plural to the singular and/or from the singular to the plural as is appropriate to the context and/or application.

What is claimed is:

1. A multi-point communication device for describing and predicting an event, the multi-point communication device comprising:

a plurality of random paths and a plurality of communication terminals;

wherein a communication terminal of the plurality of communication terminals connects one or more random paths of the plurality of random paths, and the plurality of random paths connected to different communication terminals have mutually contacting or close positions with each other;

when the communication terminal is activated, the communication terminal oscillates in potential energy, and potential energy of the communication terminal and potential energy of the one or more random paths connected thereto are synchronized;

an amplitude of the potential energy of the communication terminal which is activated is less than a minimum connection threshold required for connecting different random paths of the plurality of random paths;

when a potential energy difference between the different random paths that are in contact with or close to each other exceeds the minimum connection threshold, the different random paths connect to each other; and wherein, the event has different characterization parameters which activate the different communication terminals, the activated communication terminals that are oscillated asynchronously in potential energy, when a superimposed potential energy difference exceeding the minimum connection threshold is formed between the different random paths, the different random paths connected to each activated communication terminal are prompted to interconnect, to form a network that describes the event.

2. The multi-point communication device for describing and predicting the event of claim 1, wherein the multi-point communication device comprises the plurality of random paths and a plurality of communication terminal sets; when two random paths are in contact with or close to each other, and when a potential energy difference between the two random paths exceeds a threshold $\Delta E_{TS}$, the two random paths that are in contact with or close to each other are connected;

each communication terminal set comprises multiple communication terminals, and each communication terminal set receives the same type of signals input from outside, different signal parameter values under the same type of signals activate different communication terminals in the communication terminal set;

each communication terminal connects to the plurality of random paths;

after the communication terminal is activated, its internal potential energy oscillates, and the random paths connected to the communication terminal oscillates in potential energy along with the potential energy of the communication terminal; the amplitude of potential energy of the communication terminal and an amplitude of potential energy of the random paths connected thereto are defined as $E_{bit}$, $E_{bit} < \Delta E_{TS} < 2E_{bit}$;

the event is decomposed into a plurality of types of characterization signals, each characterization signal is input into the communication terminal set corresponding to the type of signal, and activates the communication terminals in the communication terminal set corresponding to parameter values of the signal, and potential energy of activated communication terminals and potential energy of the random paths connected thereto oscillate within an amplitude of $E_{bit}$ range; and the different communication terminals activated by the plurality of types of characterization signals corresponding to the event oscillates simultaneously and asynchronously in potential energy, when an absolute value of the potential energy difference between any two activated communication terminals exceeds $\Delta E_{TS}$, the random paths respectively connected to each of the two activated communication terminals are connected at their mutually contacting or close positions.

3. The multi-point communication device for describing and predicting the event of claim 2, wherein spatial positions of a starting point and an ending point of each random path within the multi-point communication device are randomly distributed, and a number of input end and a number of output end of each random path are 1 or more.

4. The multi-point communication device for describing and predicting the event of claim 2, wherein when an absolute value of the potential energy difference between any two activated communication terminals exceeds $\Delta E_{TS}$, the random paths respectively connected to each of the two activated communication terminals are temporarily connected at their mutually contacting or close positions; when the absolute value of the potential energy difference between any two activated communication terminals exceeds $2E_{bit}$, the random paths respectively connected to each of the two activated communication terminals generate long-term connections at their mutually contacting or close positions.

5. The multi-point communication device for describing and predicting the event of claim 4, wherein the multi-point communication device further comprises a potential energy amplifier, which is connected to the plurality of random paths; the potential energy amplifier is receiving low-amplitude potential energy fluctuations input from the random paths connected thereto, and outputting high-amplitude potential energy fluctuations to the random paths or other random paths.

6. The multi-point communication device for describing and predicting the event of claim 5, wherein the amplitude of potential energy output by the potential energy amplifier is defined as $E_{Bit}$, wherein $E_{Bit} > E_{bit}$.

7. The multi-point communication device for describing and predicting the event of claim 6, wherein $2E_{bit} > E_{Bit} > E_{bit}$.

8. The multi-point communication device for describing and predicting the event of claim 1, wherein signals of the event comes from a detection of a real world, or from signals of a virtual event output by an electronic computer program, or from signals output by other multi-point communication devices, and wherein information of the event is classified, and different parameter value information in a certain type of parameter information of the same or similar properties activates different communication terminals and random path clusters connected thereto in the multi-point communication device.

9. The multi-point communication device for describing and predicting the event of claim 1, wherein the plurality of random paths are selected from nerve cells, or selected from communication wave bands of a specific frequency, or selected from a semiconductor paths having properties of the plurality of random paths described in the technical solution, or a physical electrical circuit with a similar function, or one or more of the above.

10. The multi-point communication device for describing and predicting the event of claim 1, wherein the plurality of random paths are neurons, and the plurality of communication terminals are neurons connected to an external sensor or a signal output end; and the device comprises a neural cell cluster, a neural development and maintenance system for maintaining growth and development of neural cells, and an array voltage controller which is connected to the nerve cells in the nerve cell cluster through nerve electrodes to transmit electrical signals and regulate electric potential within each nerve cell connected thereto; and the device further comprises a data source that can output event information, where the event information output by the data source has different information parameters, the different information parameters are converted into asynchronously changing electric potentials through the array voltage controller, and then corresponding asynchronously changing electric potentials are simultaneously generated within different nerve cells through connected neural electrodes, and a superimposed difference of the electric potentials generated between nerve cells promotes connection of the nerve cells, thereby converting the event into a neural network.

11. The multi-point communication device for describing and predicting the event of claim 10, wherein the neural cell cluster comprises a plurality of nerve cell clustering regions connected to each other, and different nerve cell clustering regions are respectively used to receive parameter information of different properties input by the nerve electrodes.

12. The multi-point communication device for describing and predicting the event of claim 10, wherein the array voltage controller generates electric potential differences between several neural electrodes with signal inputs, the electric potential differences including at least two levels, a smaller electric potential difference(s) is used to promote a temporary connection between the neural cells connected by different electrodes with signal inputs, while a larger electric potential difference(s) is used to promote a continuous connection between the neural cells connected by different electrodes with signal inputs.

13. The multi-point communication device for describing and predicting the event of claim 10, wherein further comprises a second array voltage controller, which is named "hippocampus", the hippocampus is connected to several nerve cells, and is receiving low-amplitude potential energy fluctuations input from nerve cells thereto, and output high-amplitude potential energy fluctuations to the nerve cells or other nerve cells connected to the hippocampus, to promote long-term connection between the nerve cells that receive high-amplitude potential energy fluctuation input.

14. The multi-point communication device for describing and predicting the event of claim 10, wherein the data source is selected from one or both of sensors and computer systems that generate event information.

15. A method for generating an internal network of a multi-point communication device, the method comprising:

detecting an event from a plurality of complex events via a plurality of detectors to obtain parameters of different dimensions of the event;

inputting parameters of each dimension into a corresponding communication terminal set, and activating the corresponding communication terminal set based on the parameters under the dimension; and activating communication terminals in different communication terminal sets based on the parameters of different dimensions synchronously, in a manner that multiple activated communication terminals in the multi-point communication device oscillates asynchronously in potential energy, and the activated communication terminals are connected to each other through a plurality of random paths, to form a description network for the event;

wherein a low-level description network serves as a communication terminal of a high-level description network for describing the complex events.

16. The method for generating the internal network of the multi-point communication device of claim 15, wherein a multi-level description network is generated within the multi-point communication device through description training utilizing standard events.

17. The method for generating the internal network of the multi-point communication device of claim 15, wherein a device of describing the complex events is taught through sensors in accordance with a method of nurturing newborn babies in human civilization.

18. A method for describing timing events in a multi-point communication device, wherein frame events refer to events that do not evolve, wherein the timing events comprise a plurality of the frame events, each of which has the same parameter values, and each of which has one or more different parameter values, and changes of one or more different parameters between the frame events having timing sequential and continuous characteristics, and wherein steps for describing timing events comprises:

step 1: completing a description of a pre-frame event in the multi-point communication device;

step 2: closing a communication terminal of a plurality of communication terminals corresponding to parameters in the pre-frame event that do not overlap with a post-frame event, and the plurality of communication terminals that have been closed are separated from an original communication terminal network describing the pre-frame event, keeping the communication terminal corresponding to parameters in the post-frame event that overlaps with the pre-frame event in an activated state, synchronously activating the communication terminal(s) corresponding to the parameters in the post-frame event that does not overlap with the pre-frame event and connecting the communication terminals that is activated to the network describing the pre-frame event to form a network describing the post-frame event, and completing a transition from describing the pre-frame event to describing the post-frame event; and step 3: after describing the post-frame event, utilizing the post-frame event as a new pre-frame event to initiate a description of a further post-frame event, and describing each frame event within a complete timing event frame-by-frame to form a description network for the complete timing event.

19. The method for describing timing events in a multi-point communication device of claim 18, wherein a network connection channel for a transition from the pre-frame event activation state to the post-frame event activation state has been formed between the pre-frame event and the post-frame event in the description network for the timing events, and the transition is an optimal solution for the communication terminals to communicate driven by potential energy differences; and the description of each frame in the timing events utilizing an internal network of the multi-point communication device is encoded frame to frame through the potential energy differences of the optimal solution, the transition from the pre-frame event activation state to the post-frame event activation state is an inevitable result driven by the potential energy differences, and the timing naturally exists in the description network for the timing event formed in the multi-point communication device.

20. The method for describing timing events in a multi-point communication device of claim 19, wherein: the multi-point communication device describes the timing events, after an activation network migrates from a description network of a start frame event network to a description network of an end frame event network, in an activated description network of the end frame event network, potential energy within each communication terminal and potential energy within communication network form a certain three-dimensional potential energy distribution structure in a three-dimensional space structure of the multi-point communication device, and when a potential energy difference between the three-dimensional space structure and other communication terminals exceeds a communication threshold $\Delta E_{TS}$, realizing a migration from a description network activation state that is existed to a new description network activation state formed by autonomous induction, and realizing a prediction of a next unknown progress direction of the preceding timing events; and the other communication terminals are selected from randomly activated communication terminals, or are selected from communication terminals activated in real-time by external environmental events through detectors.

\* \* \* \* \*